(12) United States Patent
Hu

(10) Patent No.: US 7,752,950 B2
(45) Date of Patent: Jul. 13, 2010

(54) ELECTRIC MITER SAW

(75) Inventor: Gui Qiang Hu, Yu Yao (CN)

(73) Assignee: Nig Bo Yang Ming Electric Tools Company, Ltd. (CN)

( * ) Notice: Subject to any disclaimer, the term of this patent is extended or adjusted under 35 U.S.C. 154(b) by 287 days.

(21) Appl. No.: 11/633,217

(22) Filed: Dec. 4, 2006

(65) Prior Publication Data

US 2007/0074611 A1  Apr. 5, 2007

Related U.S. Application Data

(62) Division of application No. 10/840,811, filed on May 7, 2004, now abandoned.

(51) Int. Cl.
*B23D 45/04* (2006.01)

(52) U.S. Cl. .............................. 83/397; 83/478; 83/490

(58) Field of Classification Search .................. 83/397, 83/478, 483, 485, 486, 486.1, 487, 488, 489, 83/490; 30/390, 391
See application file for complete search history.

(56) References Cited

U.S. PATENT DOCUMENTS

| | | | | |
|---|---|---|---|---|
| 3,483,901 A | | 12/1969 | Kyle | 83/471.3 |
| 4,805,504 A | * | 2/1989 | Fushiya et al. | 83/397 |
| 5,054,352 A | | 10/1991 | Fushiya et al. | 83/486.1 |
| 5,129,300 A | | 7/1992 | Kawakami | 83/471.2 |
| 5,241,888 A | | 9/1993 | Chen | 83/471.3 |
| 5,370,025 A | * | 12/1994 | Itzov | 83/397 |
| 5,579,584 A | | 12/1996 | Hoffman | 30/391 |
| 5,638,731 A | * | 6/1997 | Garuglieri | 83/397 |
| 5,778,747 A | * | 7/1998 | Chen | 83/471.3 |
| 5,862,732 A | | 1/1999 | Itzov | 83/471.3 |
| 5,870,939 A | | 2/1999 | Matsubara | 83/486.1 |
| 6,014,813 A | * | 1/2000 | Merino | 30/391 |
| 6,279,442 B1 | * | 8/2001 | Chang | 83/397 |
| 6,854,372 B2 | | 2/2005 | Anthony | 83/581 |
| 2002/0104416 A1 | * | 8/2002 | Brickner et al. | 83/100 |

OTHER PUBLICATIONS

International Search Report.

* cited by examiner

*Primary Examiner*—Stephen Choi
(74) *Attorney, Agent, or Firm*—McDonnell Boehnen Hulbert & Berghoff LLP

(57) ABSTRACT

An electric miter saw includes a base, a cutting table, a cutting member and a link arm. The cutting table is mounted on the base. The upper portion of the link arm is connected to a cutting member with the cutting saw blade driven by a motor. The lower portion of the link arm is connected to the upper portion of a supporting member and secured by a threaded central bolt. The linear ball bearing is mounted in the inner aperture of the supporting member, which is slidably connected to the slide rod by a linear ball bearing. At the outer end of the slide rod is mounted a position limit socket. The inner end of the slide rod is connected and secured beneath the cutting table via a releasable securing configuration mentioned above. A flexible blade guard is also provided.

10 Claims, 13 Drawing Sheets

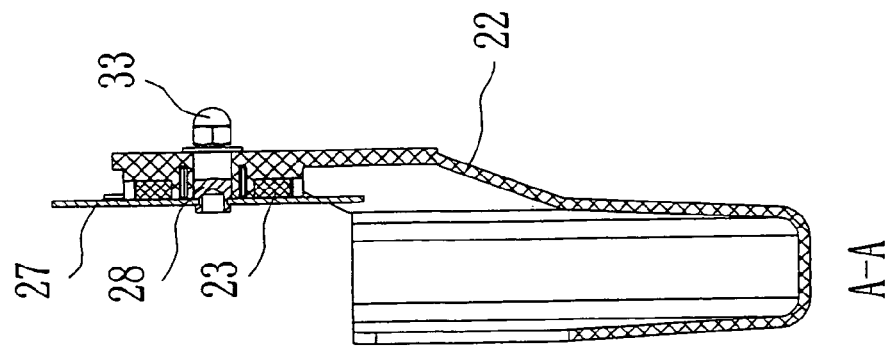
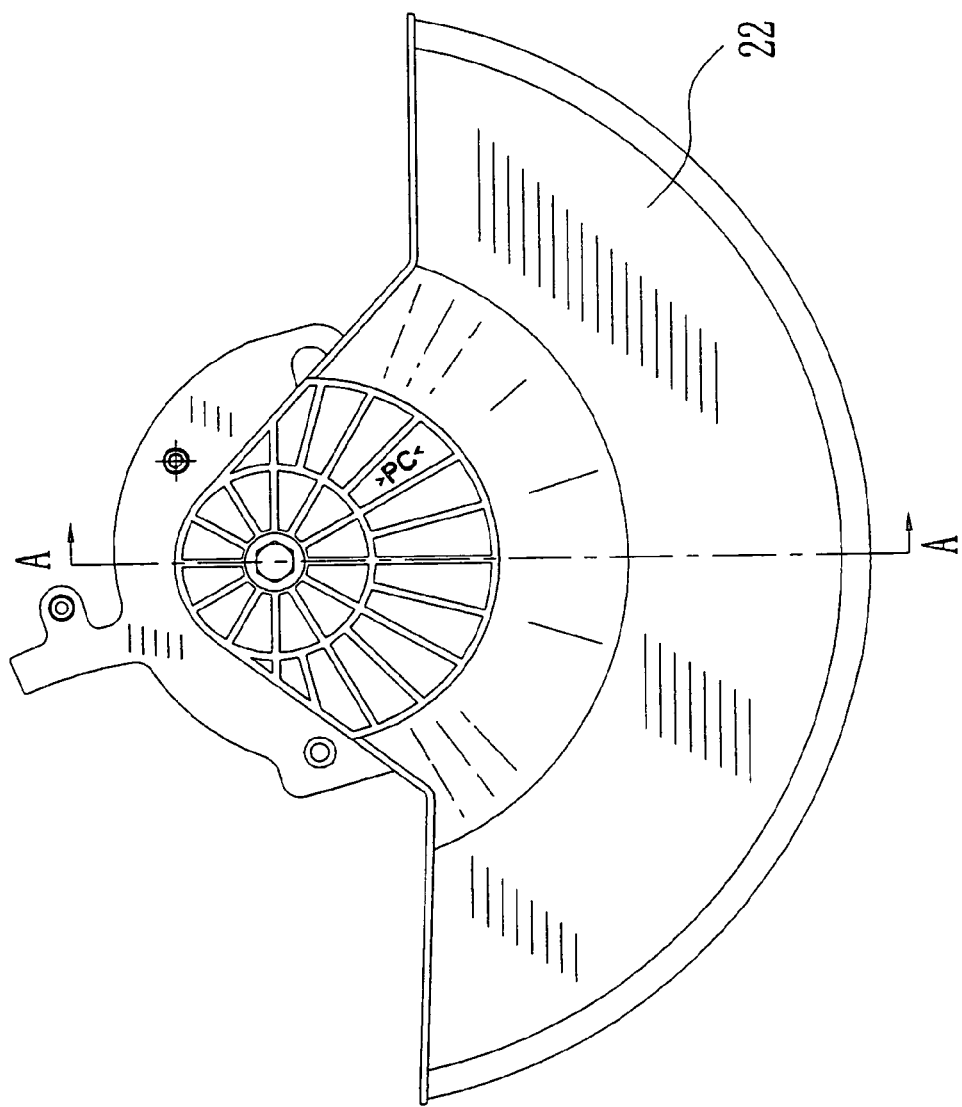

ELECTRIC MITER SAW

This is a divisional application claiming the priority of U.S. patent application Ser. No. 10/840,811, filed May 7, 2004.

BACKGROUND OF THE INVENTION

This invention relates the technical field of an electric miter saw.

Because of the development in the construction material industry, an electric saw in the electric tools is widely used to cut metal tubes, angle irons, channel steels, various kinds of timber and stones. Hence, an electric saw has a large market, and science and technology staffs are developing various types of electric saws. A cutting width limit exists in the traditional and common electric saws.

If a workpiece is too wide, it cannot be cut by some saws. So, an electric saw with an adjustable cutting width has been developed, such as U.S. Pat. No. 5,054,352, in which a retractable slide rod mechanism is adopted. One end of the slide rod is housed under a cutting table and the other end can be rotatably connected to the lower end of a link arm by a supporting member. The upper portion of the link arm is connected to a fixed cutting member. With the extending and withdrawing movement of the slide rod under the cutting table, a cutting width can be adjusted. Of course, there are advantages of a compact configuration, a small dimension and convenience for use in that saw. There are disadvantages as well, for example, because the localization aperture beneath the cutting table is supported by a slidable extension, it is easy to shake, which can cause the inaccuracy in localization and decrease of cutting precision and needs to be improved.

A slide rod mechanism is also adopted in U.S. Pat. No. 5,862,732. One end of the slide bar is secured on the rear surface of the cutting table and on the other end is a housed a position limit member. The upper portion of the link arm is connected to a fixed cutting member while the lower portion can be rotatably connected to the supporting member. In the inner aperture of the supporting member are mounted linear ball bearings, by which the supporting member and slide rod can be rotatably connected. Therefore, the disadvantages in the last U.S. patent can be avoided, such as an easy shake, an inaccurate localization and decrease of precision. However, the slide rod secured under the cutting table gives the saw a non-beautiful and a slightly large appearance. Therefore, most of space under the cutting table cannot be utilized fully and the proportion of the machine is affected. And it can cause the reduction of the area of the cutting table that can be utilized efficiently and therefore affects the width of its cutting stroke, which are all needed to be improved.

On the other hand, there is no flexible blade guard on traditional electric saws and there exists some hidden troubles of safety. For that reason, an electric saw with a flexible blade guard is developed, for example, the flexible blade guard assembly for an electric saw with China's Patent No. 02266104.2. It includes a fixed guard with one end flexibly hinging to the link arm and a flexible one that is secured and co-axially move about the co-axes in the lower portion of the fixed guard. A link rod mechanism is connected to the flexible blade guard and the end of the link arm. The character of the link rod mechanism is that the short rod flexibly hinges to the end of the link arm and the other end on the link bar. The other end of the link arm flexibly hinges to the flexible blade guard. In the middle portion of the link rod is formed a track slot, which moves together with the localization pin in the inner side of the fixed blade guard. That represents a concept of design in which is adopted the control of opening and closing of the flexible blade guard by a link rod mechanism.

Though it is simple in configuration, low in manufacturing cost and easily implemented, some advantages have exposed in the practical application and they cannot be overcome, for example, the requirements of the process and installation of the link bar and slot are very high. If some errors appear during the process or installation, a dead center will be caused and the link rod mechanism will not be controlled flexibly or even be blocked dead, which will easily cause safety accidents during operation. In case those disadvantages are formed, it is very difficult to correct itself by means of adjustment of the installation position. So, a new flexible blade guard needs to be developed for the saw so that those disadvantages can be overcome.

SUMMARY OF THE INVENTION

The first technical problem to be solved in this invention is to provide an electric miter saw relating to the current technology, which has a safe and steady slide, a long cutting stroke and a beautiful appearance for the whole machine.

Another technical problem to be solved in this invention is to provide an electric miter saw with a flexible blade guard that has a simple configuration, is conveniently mounted and used. Errors in the process can be eliminated by an appropriate adjustment of the mounting position of a workpiece and the guard can be flexibly opened and closed to avoid phenomena such as dead centers, position blocking and not-in-position so that the safety in use and the convenience in maintenance are improved.

The technical scenario to solve the technical problems above embodying the invention is an electric miter saw consisting of a base, a cutting table, a cutting member and a link arm. The cutting table is mounted on the base. The upper portion of the link arm is connected to the cutting member with the cutting saw rotating driven by an electric motor and the lower portion of the link arm is secured on the upper portion of the supporting member by a threaded central bolt. A linear ball bearing is mounted in the inner aperture of the supporting member. The member can be slidably connected to the slide rod by the linear ball bearing. At the outer end of the slide rod is a position limit socket with the characteristic that the inner end of the slide rod can be secured beneath the cutting table by a discharageable securing mechanism.

What it is useful is that the discharageable securing configuration mentioned above forms localization cavity at one side beneath the cutting table, threaded apertures are opened on the sidewall of the cavity and a localization slot is opened at the inserting end for the slide rod insertion. The slide rod can be screwed in by a bolt after it is inserted into the location cavity so that the inner end of the bolt can be forced into the localization slot at the inserting end of the slide rod, securing the slide rod beneath the cutting table. The mechanism is easily assembled, has steady configuration and is convenient to use.

It is also useful that the discharageable securing configuration opens a localization aperture for the side panel behind the cutting table for the slide rod's insertion. Near the inner side of the localization aperture are formed many toggle plates that support the sliding rod. With a securing panel, the plates are connected to and fixed at the bottom of the cutting table with securing screws, securing the slide rod under the cutting table. The device has a good fastness, a simple configuration and convenience of use.

What it is more useful is that there is a position limit pin at the side surface of the front terminal of the slide rod. The pin supports the localization aperture in the side panel to prevent the slide rod from being accidentally pulled out of the cutting table. Similarly, there is a position limit socket at the rear end of the slide rod to prevent the supporting member from moving out of the slide rod during the slide.

As an improvement, there are two slide rods that are mounted left and right symmetrically under the cutting table with its central line as a benchmark. Accordingly, two apertures are also opened left and right in the cutting table to improve hardness and stability.

The technical scenario adopted in this invention to solve another technical problem is that based on the technology above, the cutting member of the saw is attached with a flexible blade guard, which includes a fixed blade guard mounted on the cutting member and a flexible one. The flexible blade guard is joined comparatively the fixed one from the bottom and is rotatably connected to the fixed one. Hence, a gear is housed on the rotatable connection position of the flexible blade guard and a rotatable tension rod is connected and fixed at the side portion of the fixed blade guard. On the upper end portion of the tension rod is a rack, which engages the gear. A slot is made at the lower portion of the bar for connection support the location pin.

The beneficial improvement is that that rack is an arc one that engages the gear and provides the flexible blade guard with more flexibility of rotation.

Another beneficial improvement is that the flexible blade guard above is coaxially connected to the fixed one so that it is convenient to be localized and mounted for production. The prominent improvement is that the teeth on the uppermost portion of the rack are formed to the blocking teeth to support the gear for position limit. So, the rack can block itself at the ultimate position, it will not fall off to affect cutting operations, and safety is improved.

Another improvement is that the bottom of the slot is arc-shaped so that the flexible blade guard can rotate more flexibly.

Also, the flexible blade guard is connected at the inner side of the connection portion to the gear and connected and secured to the fixing panel by an embedding member, a loosing-proof nut and spacer. The fixing panel is secured on the fixing guard by a securing member. It is very convenient for the flexible blade guard to be assembled and very helpful for the adjustment of engaging position between the rack and gear so that the error in the process and mounting of a part can be eliminated.

What can be also improved is that there should be a concavo-convex location mechanism between the flexible blade guard's connecting position and the interface of the gear. The mechanism is of a ring segment that is distributed circularly. It can keep the gear and flexible blade guard rotating concurrently to avoid skid. The mechanism is simple in configuration is easily assembled for production.

There is a reposition spring between the gear and the fixing panel, which provide the flexible blade guard with reposition elasticity so that the guard can be opened and closed agilely and be convenient to a user.

Finally, the flexible blade guard above can be a transparent flexible blade guard because it is very convenient for a user to watch.

Compared with the current technology, the invention's advantages are:

First, the space between the cutting table and the base can be efficiently utilized so that the slide rod can extend under the surface and its exposed part is shorter because the slide rod is secured under the surface. Therefore, the supporting member will slide more safely and smoothly on the slide rod. Secondly, the slide rod need only be housed directly on the localization cavity that is preserved beneath the cutting table and processed and fixed directly with a forcing bolt, or secured by the location aperture and securing panel. The mounting is very simple and steady, and the cutting range of the current miter saw is improved. In the miter saws of the same dimension, in order to increase the cutting range, a manufacturer will choose the increase of the stroke (to increase the length of the slide rod) to meet a consumer's need. Hence, the apparent dimension of a miter saw is increased so that the proportion of the whole saw and external packing dimension are affected. If the slide rod is mounted beneath the cutting table, the huge space beneath the surface can be utilized to maximum degree. If one end of the slide rod is extended into the cutting table by appropriate length, the proportion of the whole saw can be maintained and the external packing dimension controlled. Also, the cutting stroke will be increased and the whole saw will have a beautiful appearance, a simple configuration, which will bring an easy manufacture and a lower cost. Because of the sliding and supporting connection of the supporting member and slide rod, the connection will become compact, it is very convenient to be operated and the operation stability of the saw will be increased.

When the saw is not in use and in storage instead, loosen the securing screw, move the exposed portion of the slide rod into the table and then secure it. In that way, the space for storage and packing can be reduced and it is convenient to be stored and packed. The design of the saw's whole configuration is reasonable and simple. It is convenient to be used and brings about a good effect. The mechanism to control the opening and closing of the flexible blade guard is a gear-driven one consisting of a tension rod, a rack and gear. The configuration design is reasonable and simple, and reduce the precision of process, production and installation of every part. Even if there exists some errors, they can eliminated with the adjustment of the first engaging position of the rack and gear. It is easy to for the flexible blade guard to be in position. There exists no dead center in the design of configuration and no position block. The rotation is very flexible. It is very convenient to be maintained. With the adjustment of the teeth ratio between the rack and gear, the opening speed of the flexible blade guard can be adjusted so that the mechanism property of the saw will be increased.

BRIEF DESCRIPTION OF THE DRAWINGS

FIG. 11 is a side view of the flexible blade guard.

FIG. 12 is a cutaway view of the flexible blade guard.

DESCRIPTION OF THE PREFERRED EMBODIMENT

Figure 1:
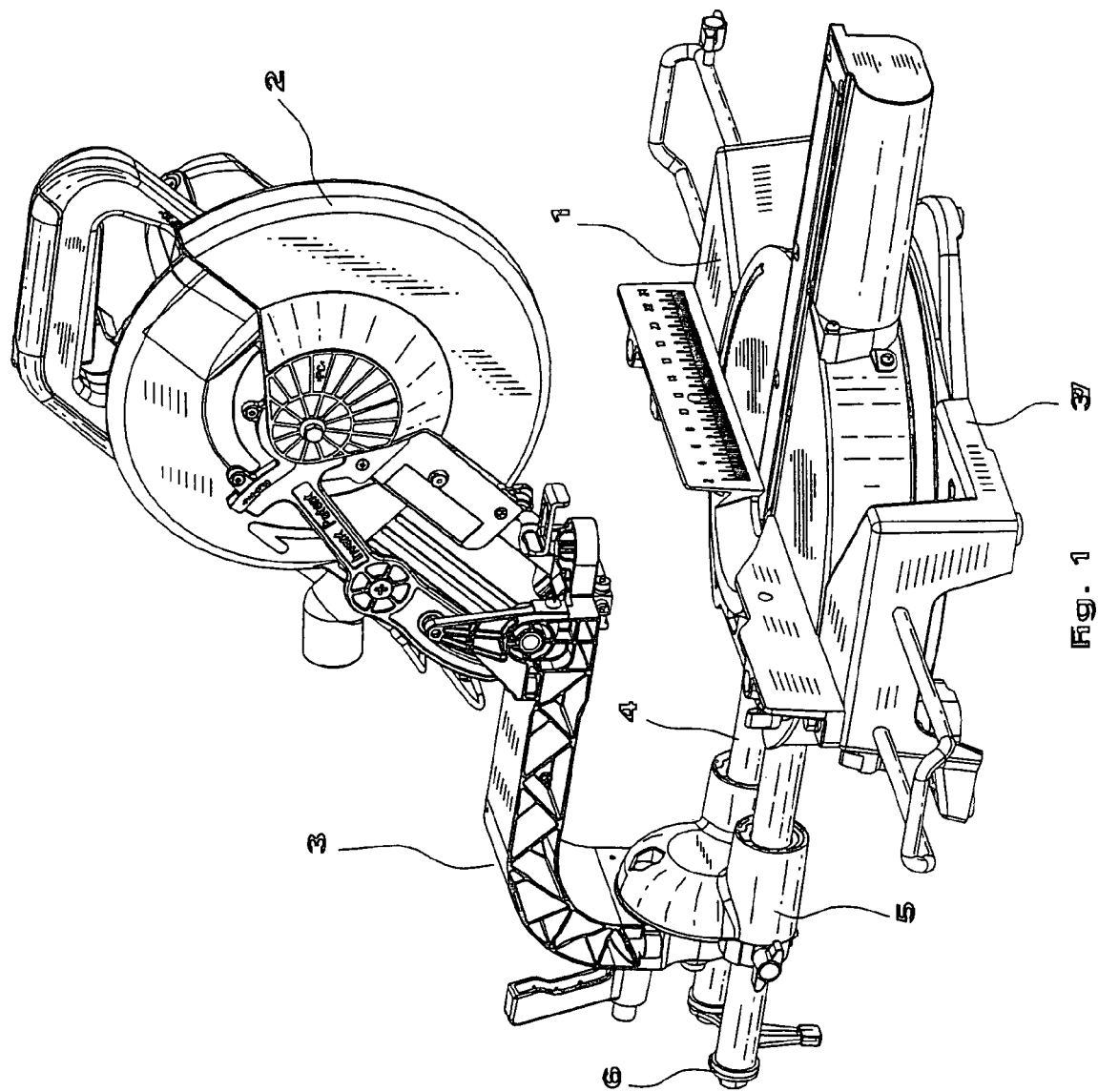
FIG. 1 is a perspective view of an electric miter saw embodying the invention.
Figure 2:
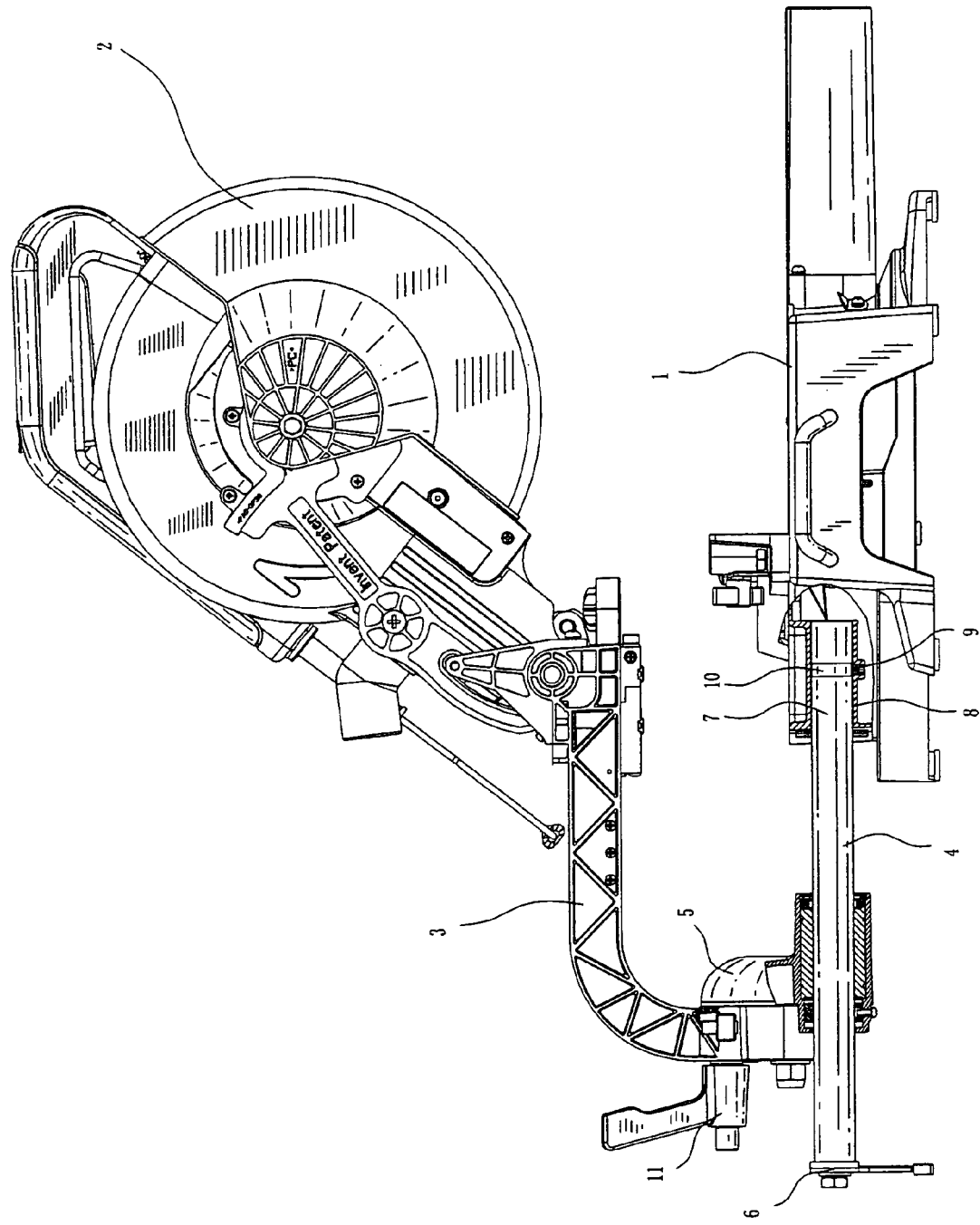
FIG. 2 is a cutaway view of an electric miter saw's configuration, illustrating the cutting width adjustment mechanism.
Figure 3:
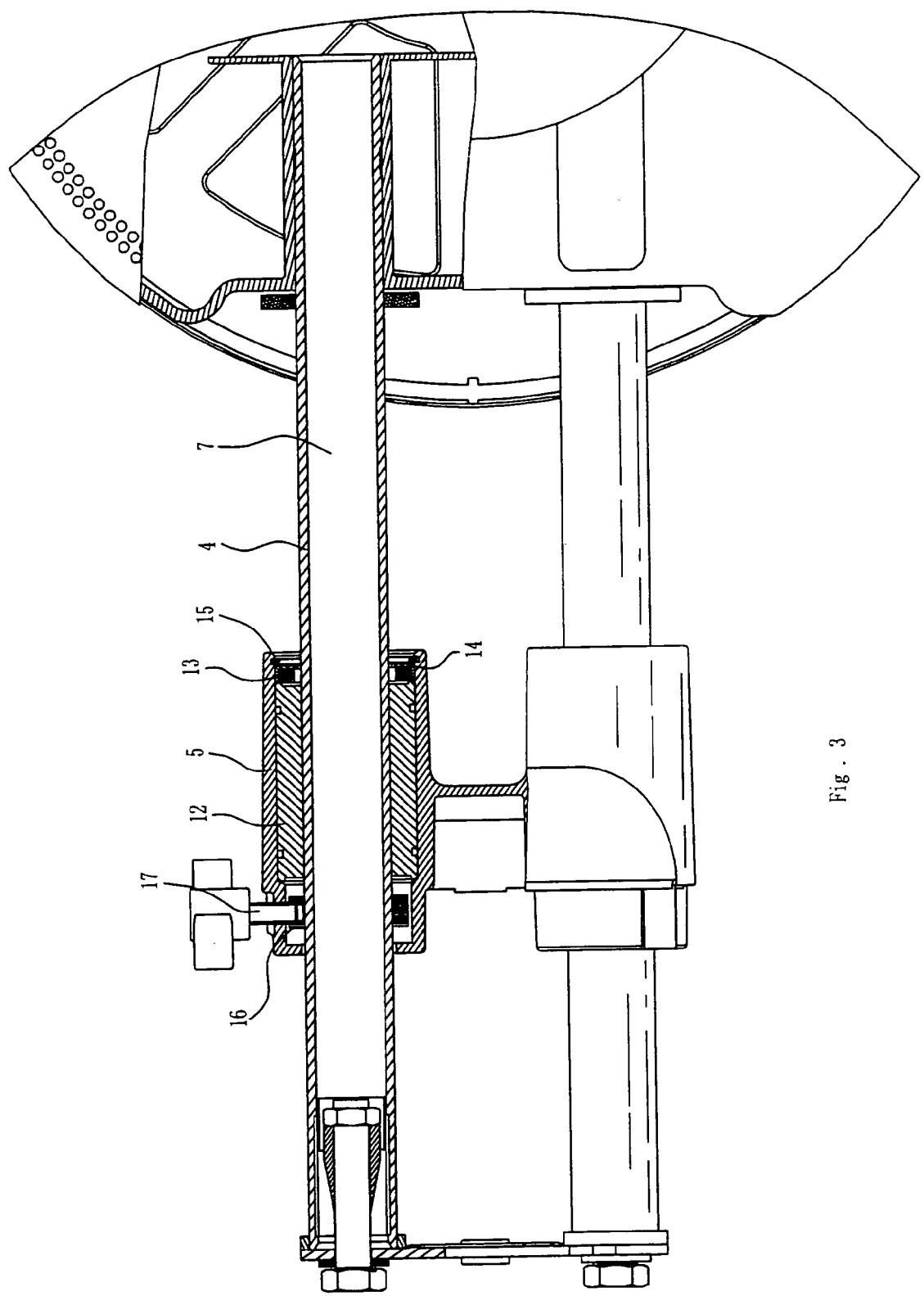
FIG. 3 is a partially magnified bottom cutaway view of an electric miter saw's configuration.

Referring to the drawings, a detailed description of the invention is as follows:

As shown in FIGS. 1, 2, 3 and 13, an electric miter saw includes components such as a base 37, a cutting table 1, a cutting member 2 and a link arm 3. The cutting table 1 is mounted on the base 37. At one side beneath the cutting table 1 are formed two localization cavities 7 (FIG. 2), which are housed left and right symmetrically beneath the table with the central line as a benchmark. There are threaded apertures on the walls 8 of the cavities. There are localization slots 10 at the inserting end for the slide rod 4's insertion of the cavity. The localization slot 10 is usually a ring-shaped slot. After the slide rod 4 is inserted into the localization cavities 7, the threaded bolt 9 is extended into the threaded aperture for its inner end to be pushed into the localization slot 10 at the inserting end to secure the slide rod beneath the cutting table 1. The outer end of the slide rod 4 is connected and secured to the position limit socket 6 by a stud. There is also a supporting member 5, on which two inner apertures are drilled correspondently. The linear ball bearings 12 (FIG. 3) are mounted in the inner aperture of the supporting member by transitional support. Through the linear ball bearings 12, the member is slidably connected to the slide rod 4. The front end of the linear ball bearing is attached to the asphalt felt 13 and secured with dust-proof cover 14 and the spring 15 so that the connection between the supporting member 5 and the slide rod 4 is neither loose nor tight and can slide. At the rear end of the inner aperture of the supporting member is there a locking sheath 16 which is housed on the slide rod 4. The latch bolt 17 is threaded to connect to the locking sheath 16 by the aperture in the supporting member.

Once the supporting member 5 is slid to a selected position of the slide rod, the operator can screw down the latch bolt 17 to secure the supporting member 5 on the slide rod 4. So, the cutting width of the miter saw can be controlled. The upper portion of the link arm is connected to the cutting member 2, with the rotating cutting saw blade being driven by an electric motor. The cutting member can be manually lowered for cutting or raised for stopping cutting. The lower portion of the link arm 3 is connected and secured on the upper portion of the supporting member 5 by the threaded central bolt 11 (FIG. 2) to allow the link arm 3 to rotate appropriately as required. To loosen the threaded central bolt 11, the link arm 3 can be turned to a required angle to meet the need of a workpiece cutting, and the threaded central bolt 11 may be tightened to secure the link arm 3.

In the example embodying the invention, the operation of the dischargeable fixing configuration between the slide rod and the cutting table is as follows. When the electric miter saw is needed to cut a workpiece, an operator will insert the inserting end of the slide rod 4 into the localization cavity 7 beneath the cutting table, then screw the threaded bolt 9 into the screw in the wall of the cavity 8 and tighten the bolt 9 to force the inner end of the bolt into the localization slot 10 at the inserting end of the slide rod. The operator secures the slide rod 4 beneath the cutting table 1 tightly, then loosens the threaded central bolt 11 as required, adjusts the connecting angle between the link arm 3 and the cutting table 1 for the bevel angle of the cutting member 2 to meet an operating requirement, and then screws down the threaded central bolt 11. When arranged as described above, the electric miter saw will be in the working status as required, and the operator can manually lower the cutting member for cutting and raise it to stop cutting. He can also move freely the cutting member on the slide rod to finish cutting a very wide workpiece. When the saw is not in use, it may be stored by loosening the bolt 9 and moving the slide rod 4 out of the cutting table to reduce the space for storage or packing.

Figure 4:
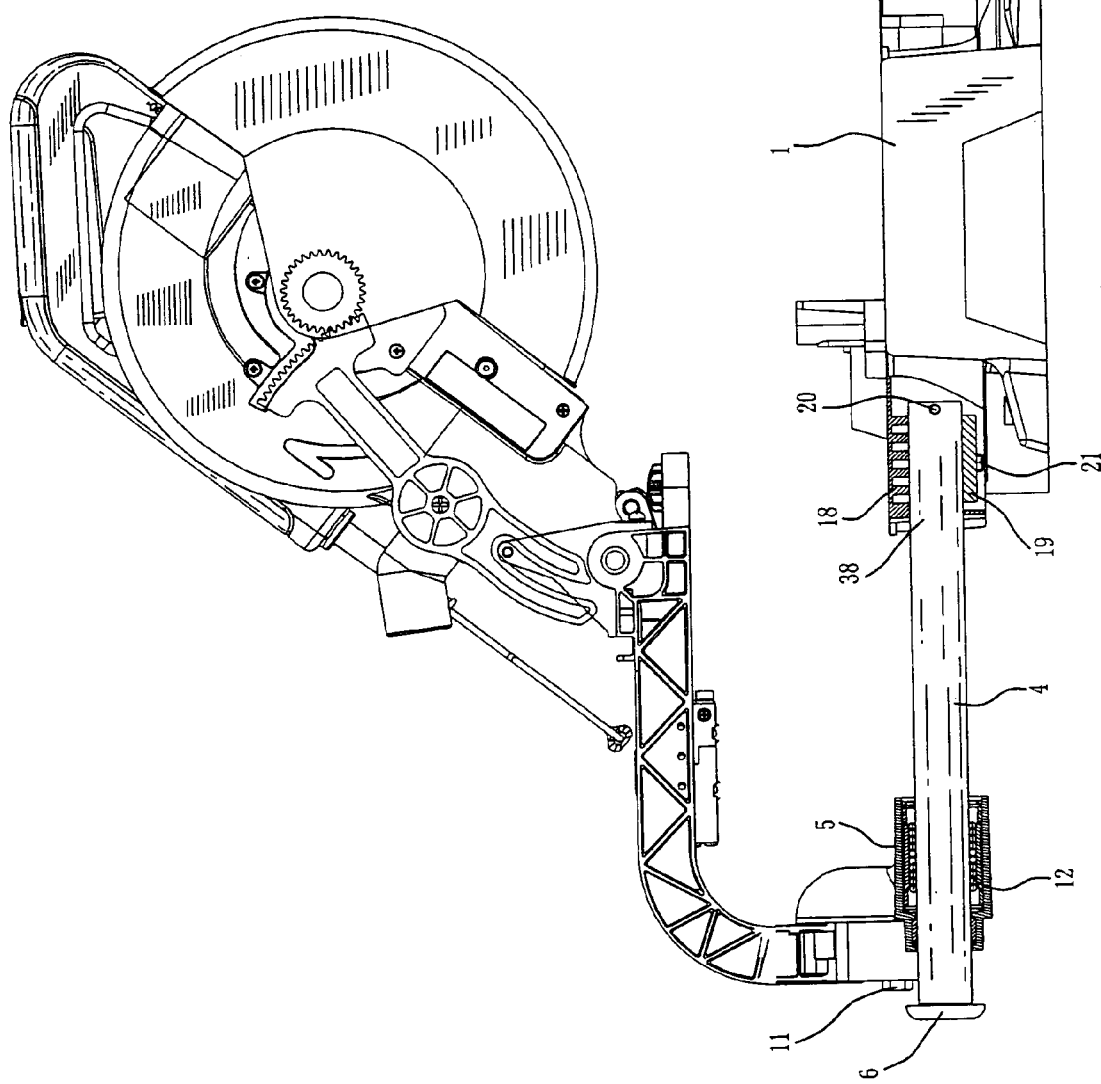
FIG. 4 is a cutaway view of the configuration of an electric miter saw, illustrating the cutting width adjustment mechanism.
Figure 5:
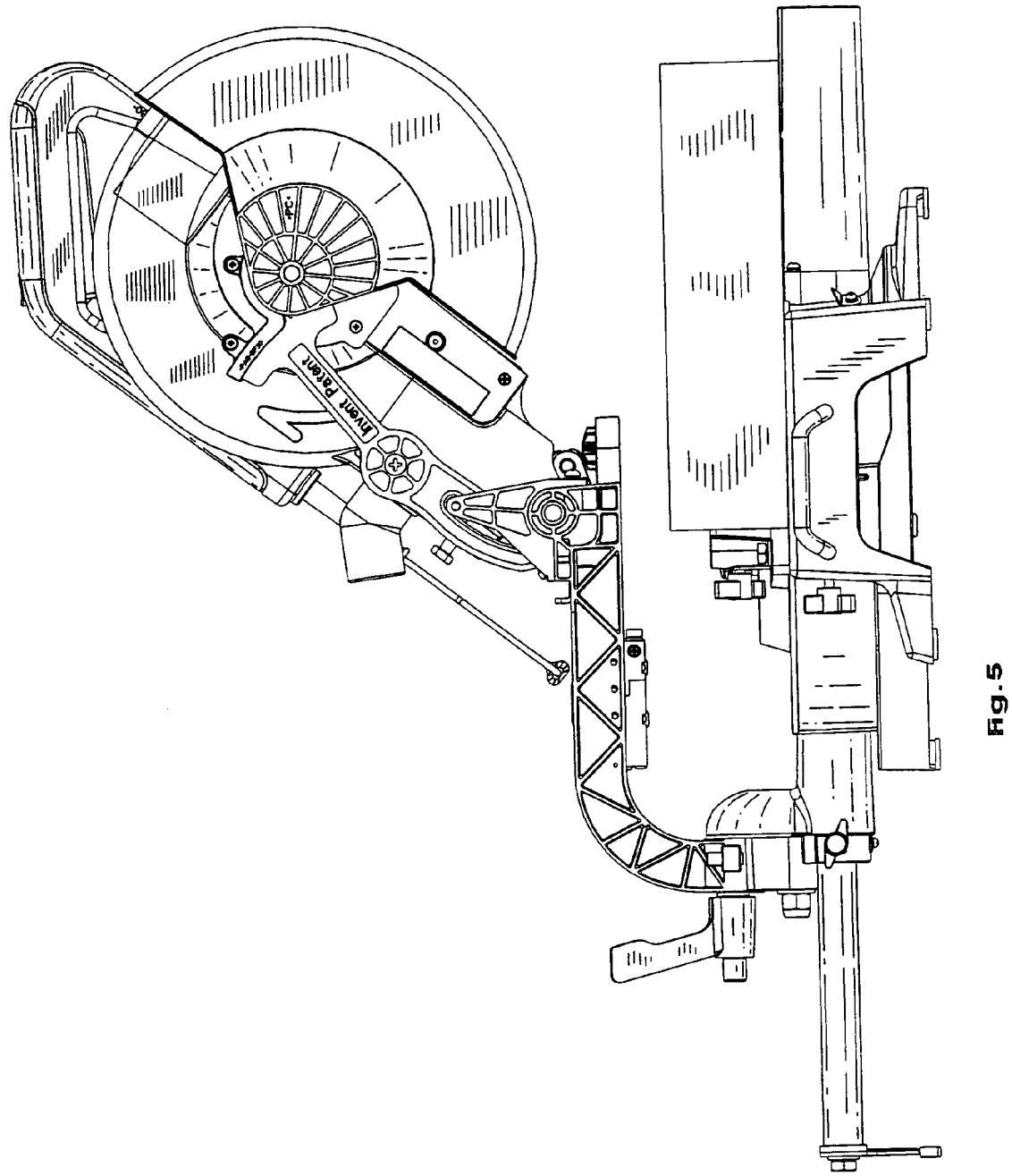
FIG. 5 is a side view of an electric miter saw's flexible blade guard being used, in which the cutting member is raised.
Figure 6:
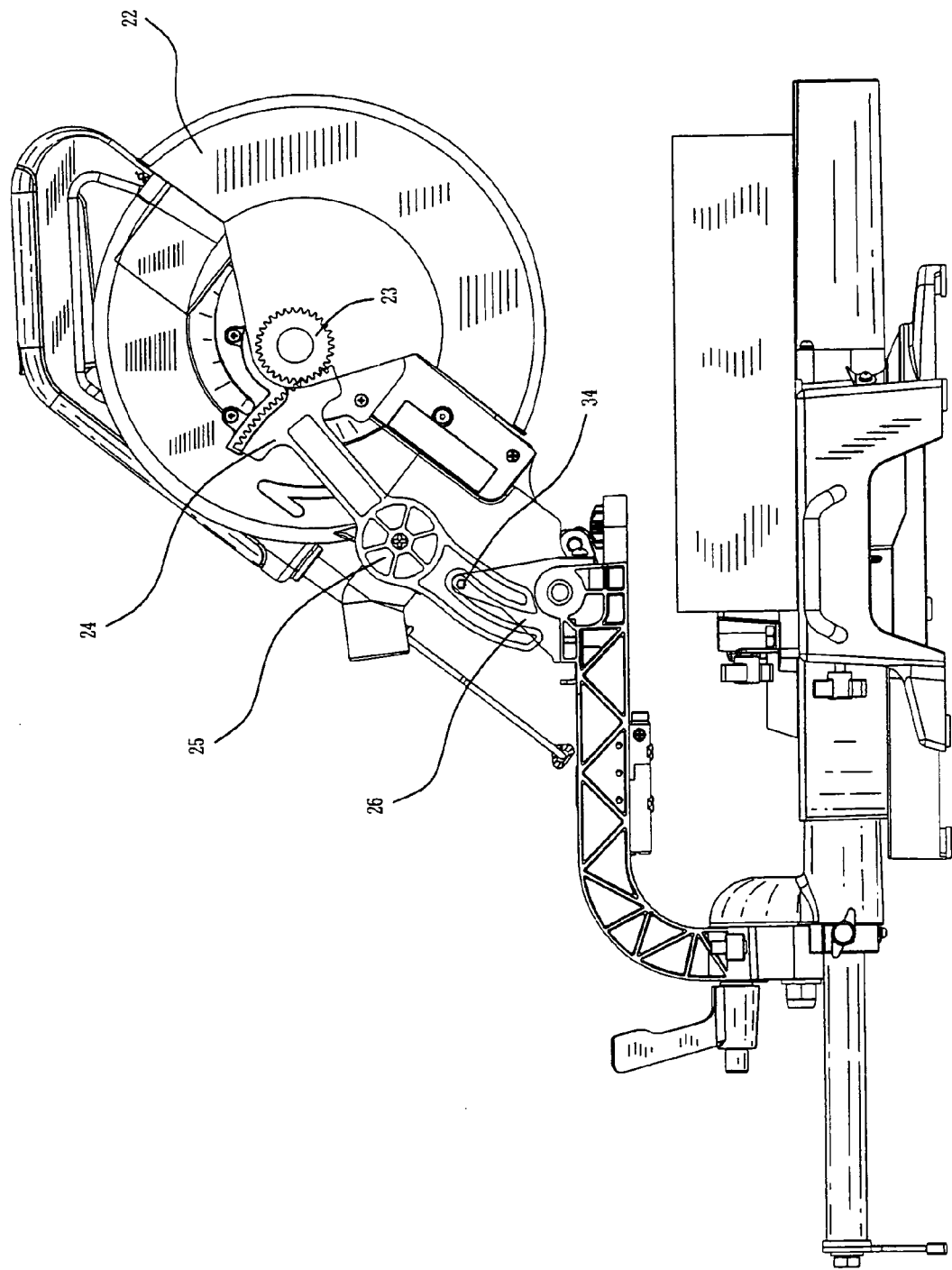
FIG. 6: is a cutaway view of the configuration of an electric miter saw's flexible blade guard, in which the cutting member is raised.
Figure 7:
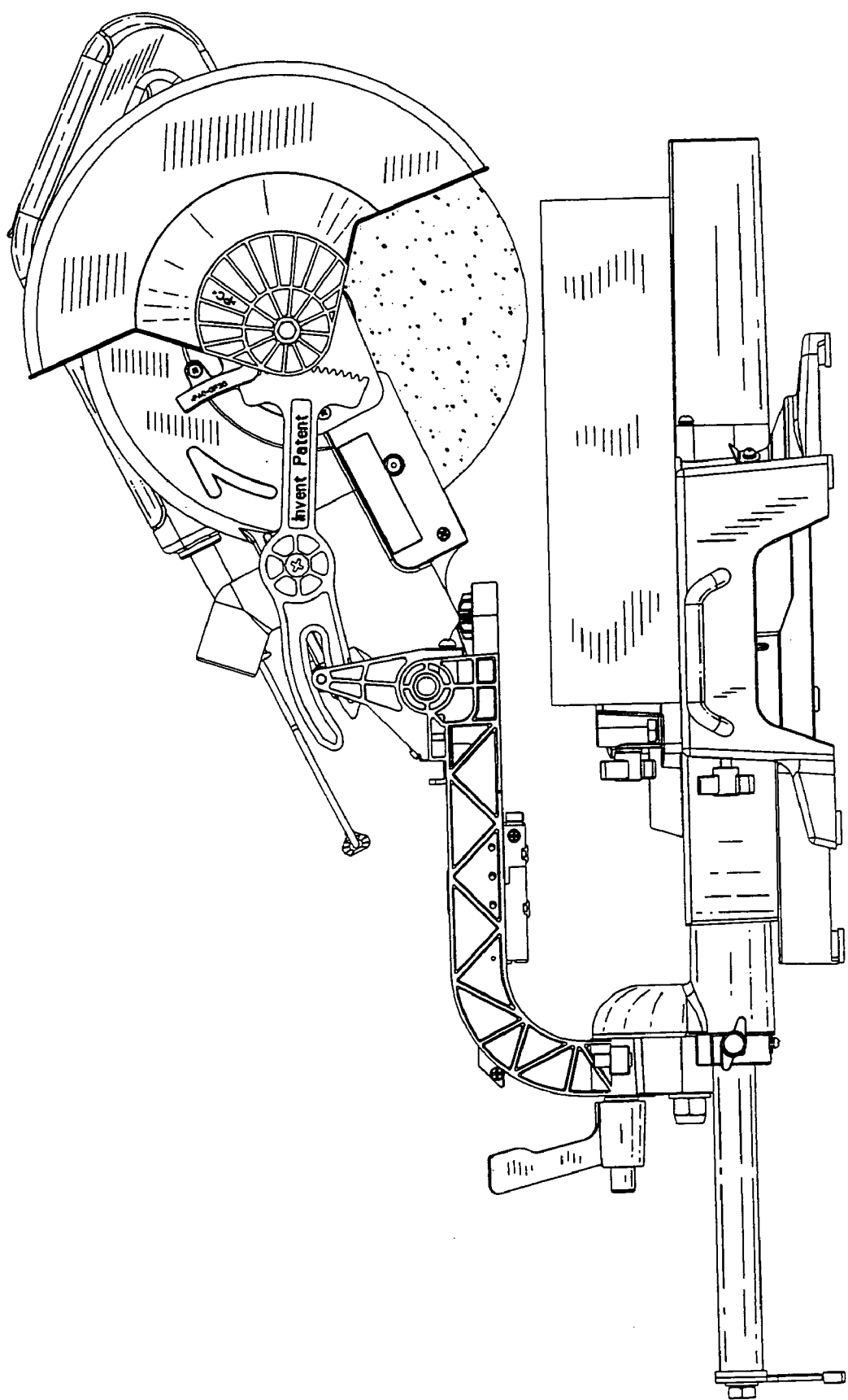
FIG. 7 is a side view of an electric miter saw's flexible blade guard, in which the cutting member is in the middle position.
Figure 8:
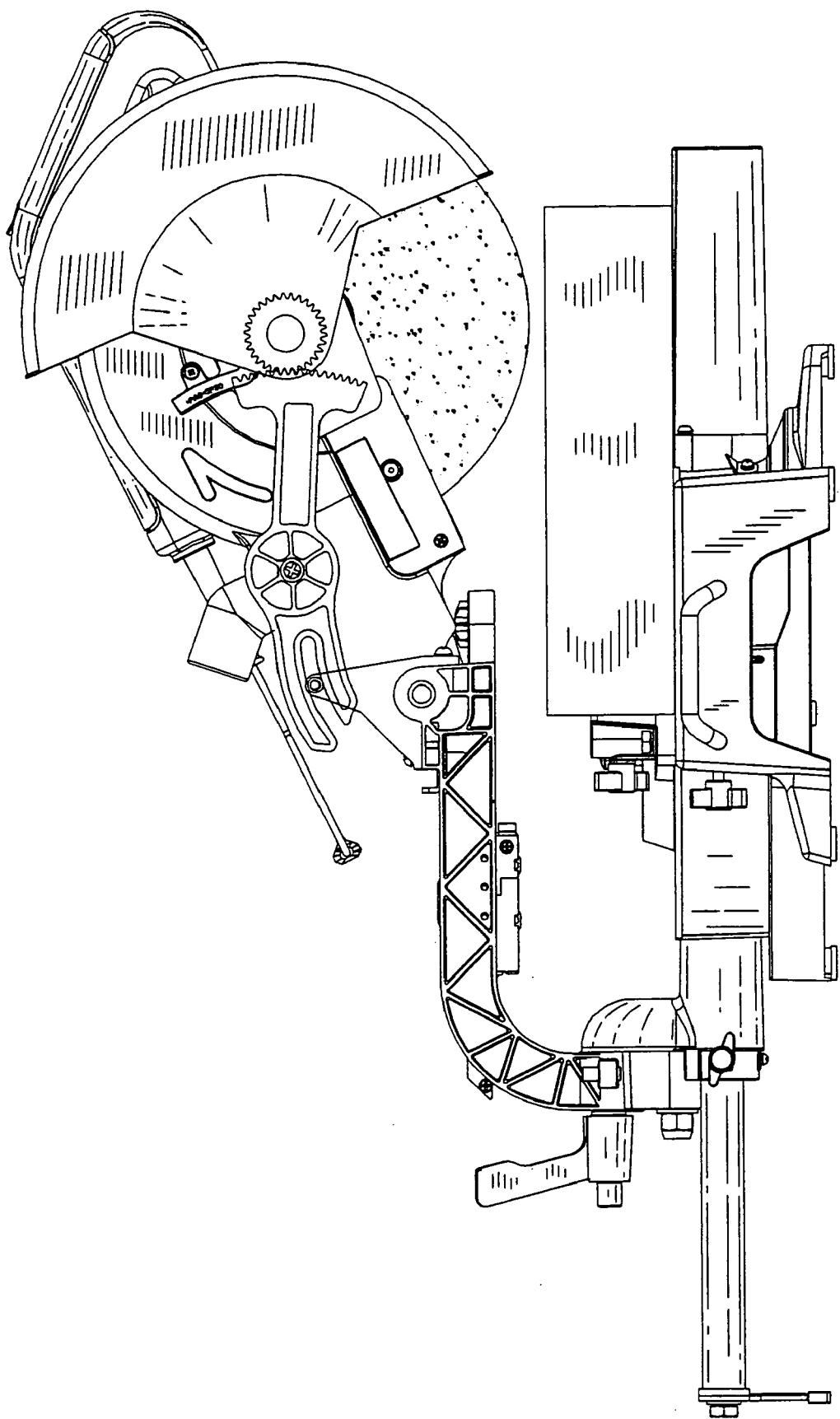
FIG. 8 is a cutaway side view of the configuration of an electric miter saw's flexible blade guard, in which the cutting member is in the middle position.
Figure 9:
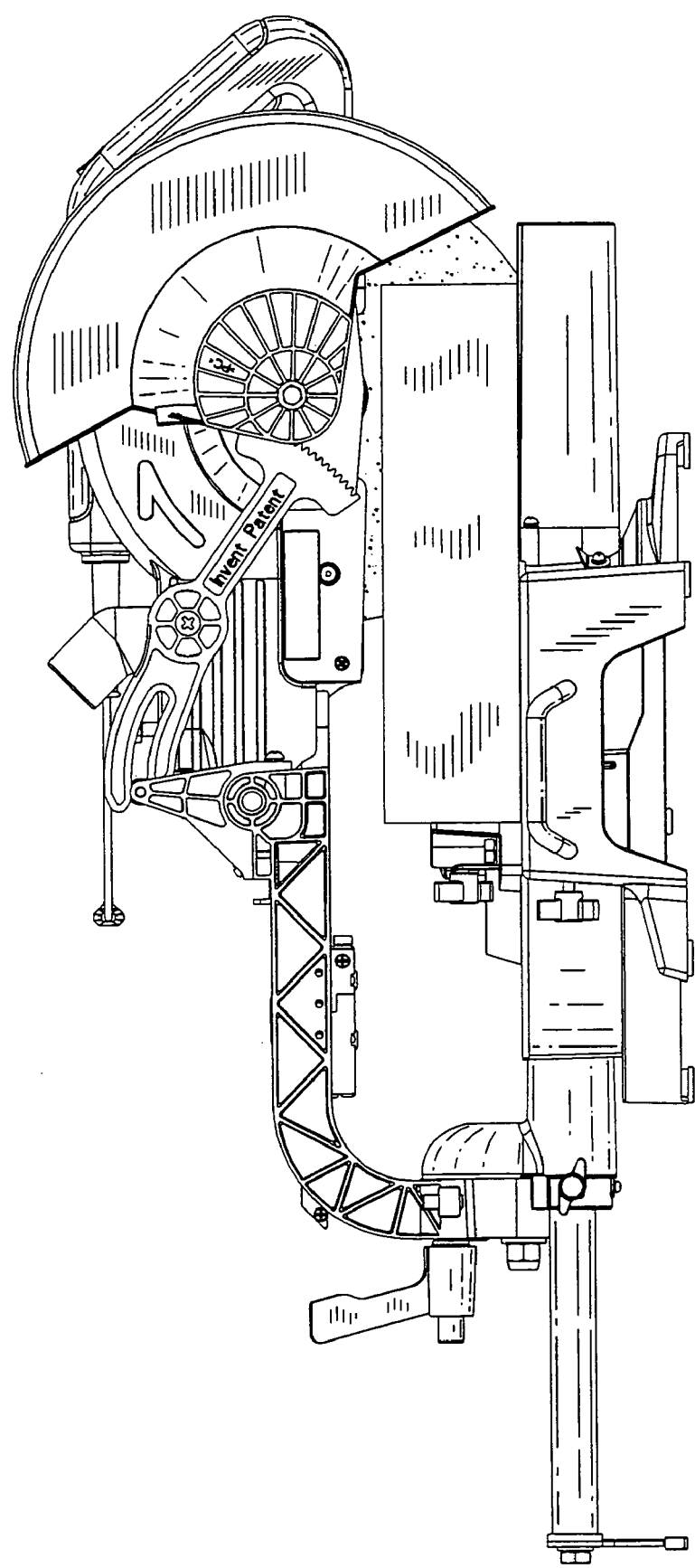
FIG. 9 is a side view of an electric miter saw's flexible blade guard in use, in which the cutting member is lowered.
Figure 10:
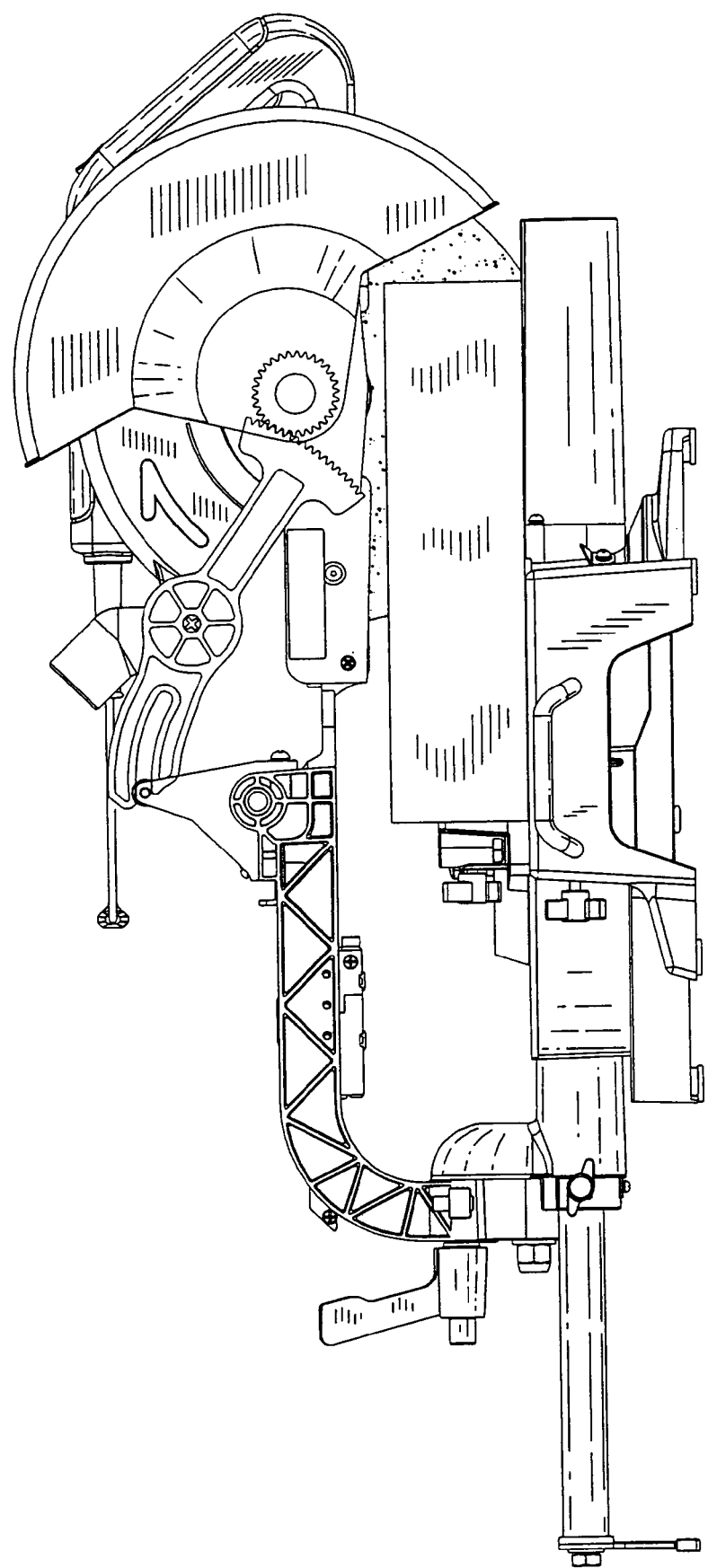
FIG. 10 is a cutaway side view of the configuration of an electric miter saw's flexible blade guard, in which the cutting member is lowered.
Figure 13:
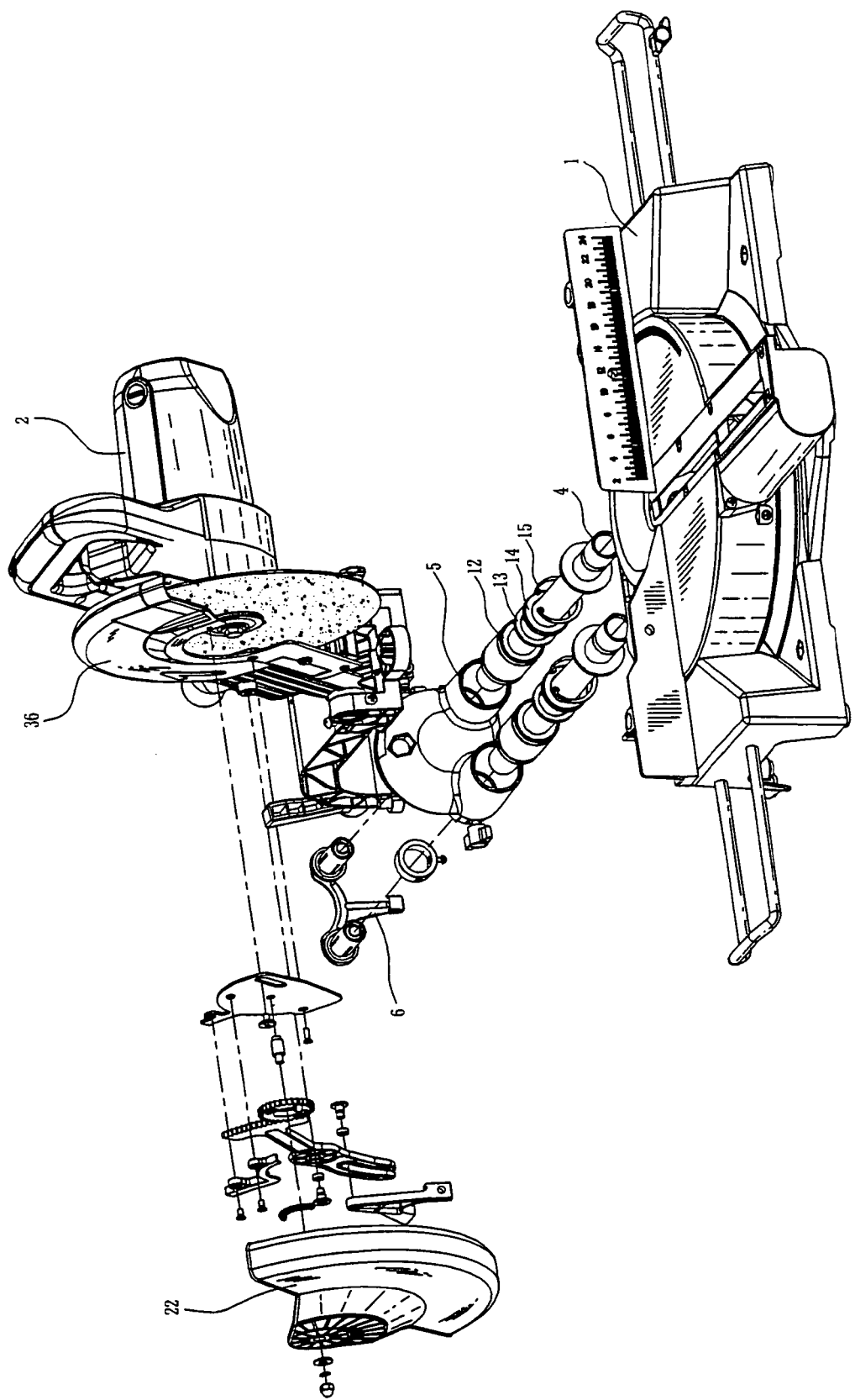
FIG. 13 is an exploded perspective view of an electric miter saw embodying the invention.

Also in the example embodying the invention, as shown in FIGS. 1, 4 and 13, the dischargeable fixing configuration between another slide rod and the cutting table is as follows. The localization aperture 38 (FIG. 4) is used for the slide rod's expansion on the side panel behind the cutting table. There are usually two such apertures, which are drilled left and right symmetrically in the two sides of the central line of the cutting table, and there are toggle plates 18 near the inner side of the localization aperture for supporting the slide rod 4. The toggle plates 18 are in the shape of an arc for improved localization to secure the tension. Accordingly, two slide rods 4 of the same size are inserted into the localization apertures for localization. The slide rods can be adjusted according to the width of the workpiece being cut for the length of the slide rod that is exposed out of the cutting table to meet a selected cutting requirement. Space is preserved in the rear portion of the bottom of the cutting table 1 to support the securing panel 19's localization.

There are preferably three securing threaded bolts 21. They are symmetrically housed at the two sides of the two slide rods to improve the location's fastness. When the securing panel 19 rams the two slide rods, the securing threaded bolt 21 is used for localization and securing so that the slide rods can be localized in a required position without any further movements. There are two inner apertures that support each on the lower portion of the supporting member 5, which can be covered at the ends of the two slide rods exposed out of the cutting table. The linear ball bearing 12 is mounted at the front side of the member's inner aperture by the transitional support. The supporting member is slidably connected to the slide rod via the linear ball bearing 12. There is a locking sheath in the rear of the supporting member's inner aperture. The locking sheath is housed on the slide rod. The locking thread bolt is screwed to the locking sheath via the aperture in the supporting member. Once the slide rod is slid to a selected position, an operator can screw down the locking threaded bolt to secure the supporting member to on the slide rod to control the cutting width of the miter saw.

At the front end of the inner apertures are attached asphalt felts which are secured by dust-proof covers and the springs to have a slidable connection that is neither too loose nor too tight between the supporting member and the slide rod. The configuration is similar with the one in the example above, and no numbers are needed to be marked in the drawings. The upper portion of the supporting member 5 is connected to the lower end of the link arm by the threaded central bolt 11, allowing the link arm 3 to rotate appropriately as required, for example, to loosen the threaded central bolt 11 to allow the link arm 3 to turn to an angle to meet the need of cutting a workpiece. Once the link arm is rotated, the threaded central bolt 11 is screwed down to secure the link arm 3. The upper end of the link arm 3 is connected to the cutting member 2 by a shaft and bearing for the cutting member to be manually lowered for cutting and raised to stop cutting.

There is the position limit pin 20 (FIG. 4) housed at the side surface of the slide rod's front end that supports the localization aperture to prevent the slide rod from being pulled out accidentally. Similarly, there is position limit socket 6 at the rear end of the slide rod to prevent the supporting member from falling off the bar in the slide.

The operation principle of the fixed configuration embodying this invention is as follows. When the operator needs the electric miter saw to cut a workpiece, he can adjust the length that the slide rod 4 extends out of the cutting table as he needs. Generally, loosen the securing threaded bolt 21 first, adjust the length that the slide rod extends out of the cutting table so that the cutting width of the electric miter saw can meet the operator's requirement, ram and screw down the securing threaded bolt 21 to localize and secure the slide rod 4. Loosen the threaded central bolt 11, adjust the connecting angle between the link arm 3 and the cutting table 1 for the bevel angle of the cutting member 2 to meet the operation requirement, and then screw down the threaded central bolt 11. In that way, the electric miter saw will be arranged as needed by the operator. With a hand holding the cutting member, an operator can lower the cutting member for cutting or raise it to stop cutting, and he can freely move the member and have a cutting operation on the slide rod 4 to finish cutting a very wide workpiece.

When the electric miter saw is not used and may be stored, the threaded bolt 21 can be loosened, and the exposed part of the slide rod can be moved into the cutting table and secured to reduce the space needed for storage and packing.

Figure 14:
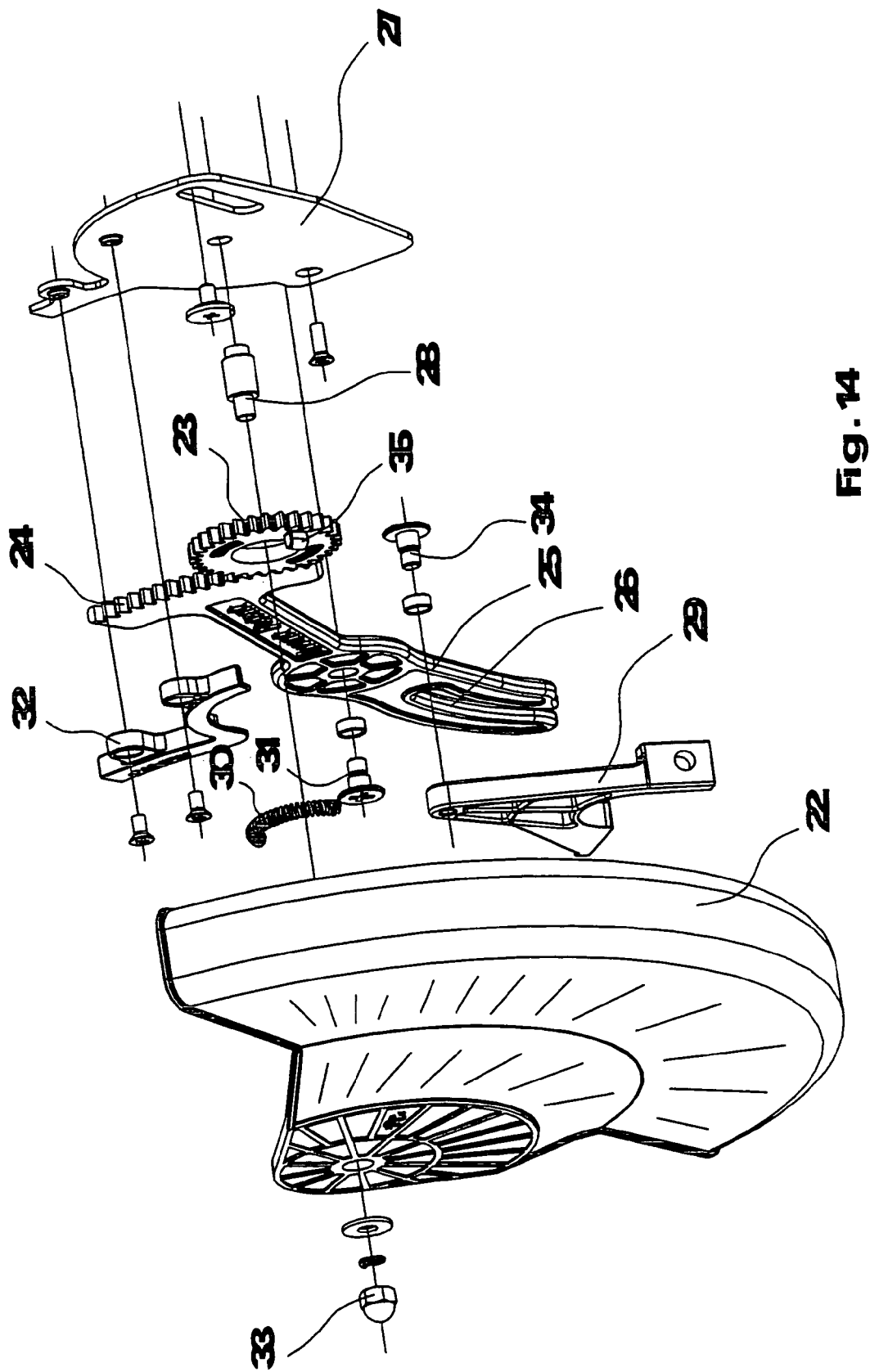
FIG. 14 is a partially magnified view of the electric miter saw of FIG. 13.

As shown in FIGS. 5, 6, 7, 8, 9, 10, 11, 12, 13 and 14, the flexible blade guard on this electric miter saw includes main components such as a fixed blade guard 36 (FIG. 13) mounted on the cutting member, a flexible blade guard 22 (FIG. 14), a tension rod 25, a gear 23, a spring 30 and a fixing panel 27. Referring to FIGS. 13 and 14, the fixed blade guard 36 is connected to the link arm 3 on the miter saw by a rotating shaft. The lower end of the link arm 3 is connected to the slide rod on the base and secured. The flexible blade guard 22 joins relatively the fixed blade guard 36 from the bottom and is rotatably connected to the fixed blade guard; What embodies the invention is the flexible blade guard 22. A gear 23 is housed on the rotation portion of the flexible blade guard 22, shown in FIGS. 14 and 12. The flexible blade guard can be rotatably connected and fixed on the fixing panel 27 by an embedding member 28, a loosening-proof nut 33, and a spacer. The fixing panel is secured on the fixed blade guard 36 by a securing member like a threaded bolt, shown as FIGS. 11 and 12. In the meantime, there is a concavo-convex localization mechanism that support each other between the flexible blade guard 22's connecting position and the gear 23. The concavo-convex location mechanism is a ring segment 35 that is distributed circularly, shown as in FIG. 14. There are connection apertures between the gear 23 and the fixing panel 27 for an ease reposition of the flexible blade guard.

Between the apertures are reposition springs 30. A rotatable tension rod 25 is connected and secured on the side portion of the fixed blade guard 22, on the upper portion of which is formed a rack 24. The rack 24 preferably has an arc shape. The rack 24 engages the gear 23. There is a slot 26 at the lower end of the tension rod, the bottom of which is shaped as an arc. The slot is connected to the localization pin 34, shown as in FIG. 6. In the example, the fixed threaded bolt is used as the location pin 34. A rolling sheath is housed on the bolt to reduce the friction caused by the threaded bolt and the slot at the lower end of the tension rod, and then the threaded bolt is secured on the fixing member 29. The fixing member is secured on the link arm 3.

To prevent the rack from falling off the gear while being used, the teeth at the most upper portion of the gear 24 are made into the blocking ones that support the gear and limit position. The teeth can prevent efficiently the rack from falling off when the rack is in an extreme position. On the rack 24 is there a protection sheath 32, which is secured on the fixing panel 27 to provide necessary protection. The flexible blade guard 22 is a transparent one so that the saw inside can be observed conveniently.

The operating principle and process of the blade guards embodied in the invention is as follows. When not being used, the flexible blade guard 22 moves back to its original position under the elasticity of the spring 30, allowing the guard 22 to be in the close status and locked, shown as in FIGS. 5 and 6. When the saw is used to cut materials, the guard will be unlocked manually and the cutting member 2 will be lowered for the cutting member to rotate downward. The fixed blade guard 36 on the cutting member will rotate downward, too. Because the tension rod 25 is rotatably secured on the fixed blade guard 36, the slot 26 beneath the lower end supports the location pin 34 on the link arm. So, the tension rod can rotate clockwise against the connecting point of the fixed blade guard. With the engagement between the rack 24 on the upper end of the tension rod and the gear 23, the clockwise rotation of the tension rod drives the guard 22 to rotate counter-clockwise and open gradually, shown as in FIGS. 7 and 8, until the cutting member 2 of the saw is lowered to its position and the guard 22 opened completely while the spring 30 rolls in for storage of energy, shown as in FIGS. 9 and 10.

When the saw is not being used for cutting, the elasticity of the spring 30 drives the gear 23 to rotate counter-clockwise and forces the flexible blade guard 22 to return to its original position until it is closed. The fixed blade guard and the cutting member will return to their original position, for the gear 23 engages the rack 24 on the tension rod, shown as in FIGS. 5 and 6. When the flexible blade guard cannot open and close to its position due to errors in the processing and installation of the components of the control mechanism, such as the gear 23, the rack 24 and the tension rod 25, what is needed is only to adjust the initial engage position of the rack 24 and the gear 23 to eliminate these deviations. Therefore, the flexible blade guard can meet the requirement of being opened and closed to its positions.

The invention claimed is:

1. In an electric miter saw having a cutting member rotatably connected to a link arm:
   a localization guide mounted on the link arm;
   a flexible blade guard mounted on the cutting member, the flexible blade guard including a gear connected to an inner side of the flexible blade guard;
      wherein the flexible blade guard is connected and secured to a fixing panel by an embedding member, a loosening-proof nut and a spacer; and
      wherein the fixing panel is secured on a fixed blade guard by a fastening member; and
   a tension rod having a first end and a second end and including a rack, the tension rod being mounted on the cutting member at a position between the first and second end, the first end having a sliding engagement with the localization guide and the second end having a toothed engagement with the flexible blade guard, where the toothed engagement is an engagement between the rack and the gear.

2. The miter saw of claim 1 wherein the localization guide is a localization pin.

3. The miter saw of claim 1 wherein the first end of the tension rod includes a slot, and wherein the sliding engagement of the tension rod is an engagement between the slot and the localization guide.

4. The miter saw of claim 3, wherein the slot is arc-shaped.

5. The miter saw of claim 4, wherein the rack is an arc-shaped rack.

6. The miter saw of claim 1, wherein the tension rod is rotatably mounted on the cutting member.

7. The electric miter saw of claim 1, wherein between the connecting portion of the flexible blade guard and the interface of the gear there is a concavo-convex location mechanism, which is a ring segment that is distributed circularly.

8. The electric miter saw of claim 1, further comprising a reposition spring connecting the gear to the fixing panel.

9. The electric miter saw of claim 1, wherein the fixing panel is connected and secured on a protecting sheath which covers the rack.

10. The electric miter saw of claim 1, wherein the flexible blade guard is transparent.

* * * * *